United States Patent [19]
Nishikiori

[11] Patent Number: 5,739,668
[45] Date of Patent: Apr. 14, 1998

[54] CHARGING CONTROL SYSTEMS AND CIRCUITS FOR RECHARGING AUTOMOBILE BATTERIES

[75] Inventor: Hidetaka Nishikiori, Hamamatsu, Japan

[73] Assignee: Suzuki Motor Corporation, Shizuoka-ken, Japan

[21] Appl. No.: 721,356

[22] Filed: Sep. 26, 1996

[30] Foreign Application Priority Data

Dec. 5, 1995 [JP] Japan ................ 7-344470

[51] Int. Cl.$^6$ ............................ H01M 10/46
[52] U.S. Cl. ................... 320/5; 220/21; 220/6
[58] Field of Search ................... 320/5, 9, 29, 30, 320/31, 32, 37, 38, 39, 48, 49, 6, 21

[56] References Cited

U.S. PATENT DOCUMENTS

| | | |
|---|---|---|
| 4,843,299 | 6/1989 | Hutchings ................ 320/31 |
| 4,992,720 | 2/1991 | Hata ................ 320/31 X |
| 5,049,804 | 9/1991 | Hutchings ................ 320/31 X |
| 5,291,118 | 3/1994 | Kojima ................ 320/37 X |

*Primary Examiner*—Edward Tso
*Attorney, Agent, or Firm*—Bell Seltzer Intellectual Property Law Group; Alston & Bird LLP

[57] ABSTRACT

A charging control unit 10 includes plug contacts 161, 162 and jack contacts 181, 182 for detecting connection of a charging plug 16 of a charger 12 to a receptacle 18, a current sensor 22 for detecting completion of charging from the charger 12 to a main battery 20, a main controller 26 for starting operation of a DC-to-DC converter 24 when connection of the charging plug 16 is detected by the plug contacts 161, 162 and the jack contacts 181, 182 and for terminating operation of the DC-to-DC converter 24 when completion of charging is detected by the current sensor 22, and a distribution circuit whereby operation of the DC-to-DC converter after completion of charging is finished.

19 Claims, 2 Drawing Sheets

CHARGING CONTROL SYSTEMS AND CIRCUITS FOR RECHARGING AUTOMOBILE BATTERIES

BACKGROUND OF THE INVENTION

1. Field of the Invention

The present invention relates to an electric automobile using electric power of a main battery to rotate an electric motor so as to propel the electric automobile, and more particularly to a charging control unit for controlling an electric circuit system in the electric automobile when the main battery is charged by an external charger.

2. Description of the Related Art

When the main battery of the electric automobile is charged, a charging plug of the charger is first inserted into a receptacle. The main battery is charged by the charger. The electric automobile is provided with a DC-to-DC converter for reducing an input voltage from the charger to a driving voltage of auxiliary equipment and to a charging voltage of an auxiliary battery. The DC-to-DC converter is adapted to start its operation simultaneously with the insertion of the charging plug. The conventional charging control unit detects a temperature or a charging current of the main battery by means of a temperature sensor or a current sensor, and forcedly interrupts charging when the detected value is unusual.

However, the conventional system has the following problems.

(1) The charger detects a charging voltage or a charging current and finishes the charging operation on the basis of the charging voltage or the charging current. The DC-to-DC converter is, however, supplied with electric power from the main battery even if the charging operation is finished, and the converter continues its operation. Accordingly, electric power is wasted, and the auxiliary battery is sometimes overcharged. When the auxiliary battery is overcharged, the life of the auxiliary battery is shortened.

(2) Even if the charging control unit detects the temperature, the charging current or the like of the main battery, the charging control unit cannot store the detected data until the next charging operation.

SUMMARY OF THE INVENTION

It is a first object of the present invention to provide a charging control unit capable of terminating operation of a DC-to-DC converter after completion of the charging operation. It is a second object of the present invention to provide a charging control unit capable of storing detected data at least until the next charging operation.

The charging control unit, according to a first aspect of the present invention, comprises a first detection means for detecting connection of a charging plug of a charger to a receptacle. The unit also includes a second detection means for detecting completion of charging from the charger to a main battery. The unit also control includes a means for starting operation of a DC-to-DC converter when connection of the charging plug is detected in the first detection means and for terminating the operation of the DC-to-DC converter when completion of charging is detected in the second detection means.

When the charging plug of the charger is connected to the receptacle, the first means detects the connection. The control unit causes the DC-to-DC converter to start its operation. On the other hand, the charger continues to charge the main battery and when the main battery is fully charged, the charging is completed. The completion of charging is detected by the second detection means. Thus, the control means causes the DC-to-DC converter to finish its operation. Accordingly, since the DC-to-DC converter is not operated after completion of charging, the power consumption is not wasted, and the auxiliary battery is not overcharged.

In the charging control unit, according to a second aspect of the present invention, the second detection means in the charging control unit includes a current sensor for detecting a charging current. The control means judges that the charging is complete when a predetermined time has passed after the charging current detected by the current sensor reduces to about zero.

When the charging is completed, the charging current is reduced to zero. The control means judges, when the predetermined time has passed after the charging current detected by the current sensor is reduced to about zero, that the charging is complete. Accordingly, even if the detection accuracy of the current sensor is low, the completion of charging is detected accurately. Consequently, a current sensor previously provided in an electric automobile for detecting a large current which occurs when the automobile is driven can be used as detection means for detecting the completion of charging as it is. Accordingly, undesired operation of the DC-to-DC converter after completion of charging can be avoided without additional components, such as terminals and leads.

In the charging control unit, according to a third aspect of the present invention, the control means in the charging control unit of the present invention preserves data stored in a memory at least until the next charging operation after the completion of charging. Thus, the detected data can be utilized for the next charging. For example, if the temperature of the main battery is unusual when the battery is charged, it can be conjectured that the main battery may have some defect.

According to the charging control unit of the third aspect of the present invention, contents stored in the memory are preserved until the next charging operation after the completion of charging, so that the already detected data, such as the value of current flowing into the main battery and a temperature of the main battery, can be utilized for various uses in the next charging operation.

DETAILED DESCRIPTION OF THE PREFERRED EMBODIMENT

Figure 1:
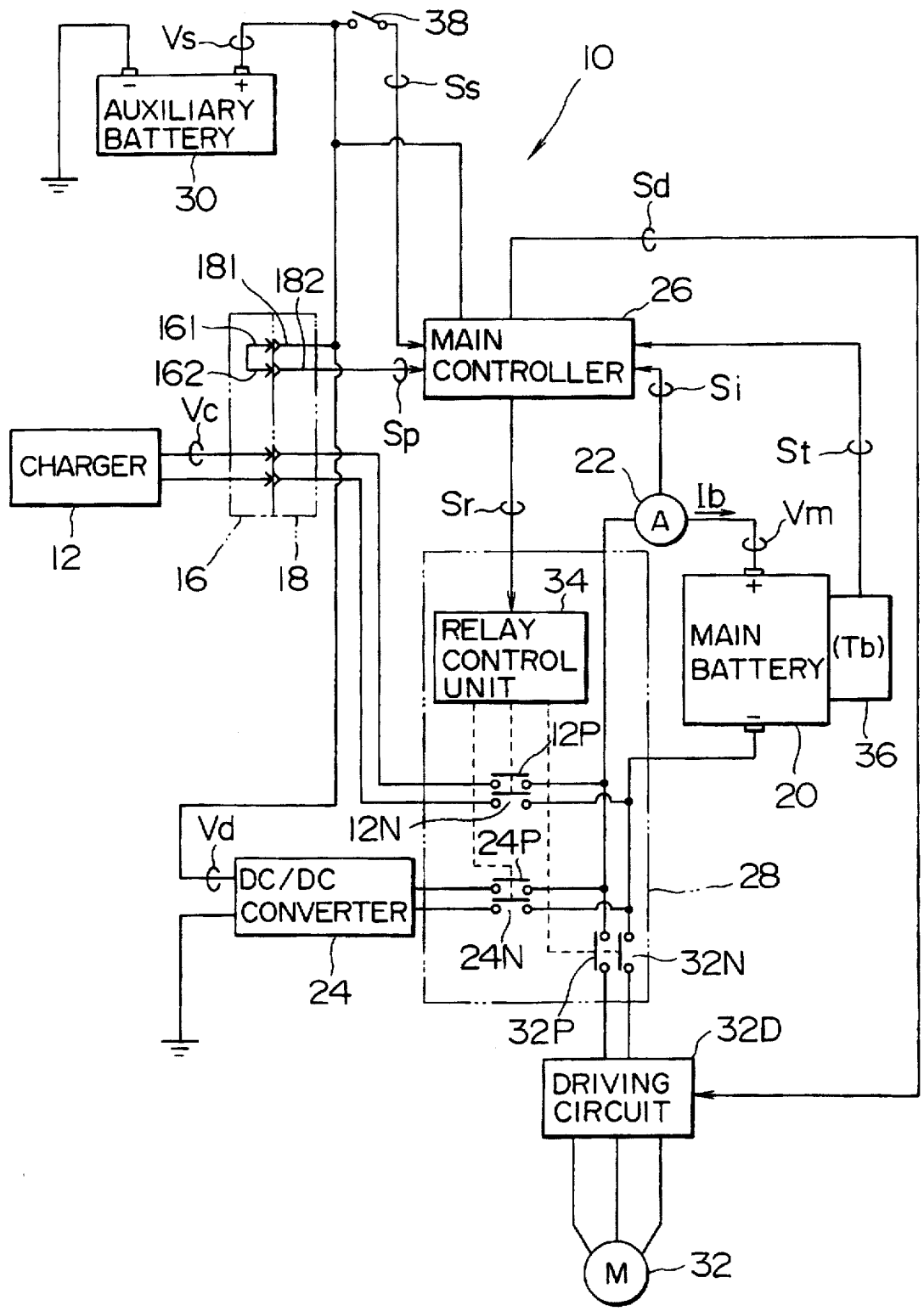
FIG. 1 is a block diagram showing an embodiment of a charging control unit according to the present invention.

FIG. 1 is a block diagram showing an embodiment of a charging control unit according to the present invention. The embodiment is now described with reference to FIG. 1.

The charging control unit 10 includes plug contacts 161 and 162 and jack contacts 181 and 182 serving as detection means for detecting connection of a charging plug 16 of a charger 12 to a receptacle 18, a current sensor 22 serving as detection means for detecting completion of charging from the charger 12 to a main battery 20, a main controller 26 serving as control means for starting the operation of a DC-to-DC converter 24 when the connection of the charging plug 16 is detected by means of the plug contacts 161, 162 and the jack contacts 181, 182 and for finishing the operation of the DC-to-DC converter 24 when completion of charging is detected by the current sensor 22, and a distribution circuit 28.

The plug contacts 161, 162 and the jack contacts 181, 182 are constructed to be connected or disconnected to or from each other simultaneously with connection or disconnection of the charging plug 16 to or from the receptacle 18. An output voltage Vs (for example 12 V) of an auxiliary battery 30 is applied to the jack contact 181. The plug contacts 161, 162 are short-circuited. The jack contact 182 is connected to the main controller 26. Accordingly, when the plug contacts 161, 162 are connected to the jack contacts 181, 182, the output voltage Vs of the auxiliary battery 30 is applied as a plug connection signal Sp through the jack contact 181, the plug contacts 161, 162 and the jack contact 182 to the main controller 26.

The current sensor 22 is provided for detecting a large current produced upon traveling of an electric automobile and detects a charging current Ib to supply a charging current signal Si corresponding to the charging current Ib to the main controller 26. The current sensor 22 may be a shunt resistor, a current detection coil or the like.

The main controller 26 is composed of, for example, a microcomputer including an input/output interface, an ROM, an RAM, a CPU and the like, and a program. This controller 26 has functions (1) and (2) mentioned below as main functions at the time of charging in addition to the above-mentioned function. (1) The main controller 26 judges that completion of the charging is detected when a predetermined time Tmt has passed after the charging current Ib detected by the current sensor 22 reduces to about zero. (2) The main controller preserves various data stored in a memory, such as the value of charging current, the charging time and the temperature of the main battery at least until the next charging operation after completion of charging. Further, the main controller 26 can select an operation mode and a waiting mode and exhibits the above function (2) in the case of the waiting mode. The main function of the main controller 26 when the automobile is driven is to receive an acceleration signal, a brake signal and the like, and output a control signal Sd to a driving circuit 32D of a drive motor 32.

The distribution circuit 28 includes charging contacts 12P and 12N for disconnecting and connecting the charger 12 and the main battery 20, contacts 24P and 24N for converter for disconnecting and connecting the DC-to-DC converter 24 from and with the charger 12 and the main battery 20, contacts 32P and 32N for driving circuit for disconnecting and connecting the driving circuit 32D of the drive motor 23 and the main battery 20, and a relay control unit 34 including an electromagnetic coil for opening and closing the charging contacts 12P and 12N, the contacts 24P and 24N for the converter and the contacts 32P and 32N for driving circuit. The relay control unit 34 opens and closes the contacts individually in accordance with a control signal Sr produced by the main controller 26.

The main battery 20 is, for example, a seal type lead battery and produces an output voltage of 300 V. A temperature sensor 36 for detecting the temperature Tb of the main battery 20 is disposed in an outer periphery of the main battery 20. The temperature sensor 36 is, for example, a thermistor, and produces a temperature signal St corresponding to the temperature Tb to supply it to the main controller 26. An ignition switch 38 for starting the automobile is connected between the main controller 26 and the auxiliary battery 30. When the ignition switch 38 is closed, the output voltage Vs of the auxiliary battery 30 is applied to the main controller 26 as a traveling start signal Ss.

Figure 2:
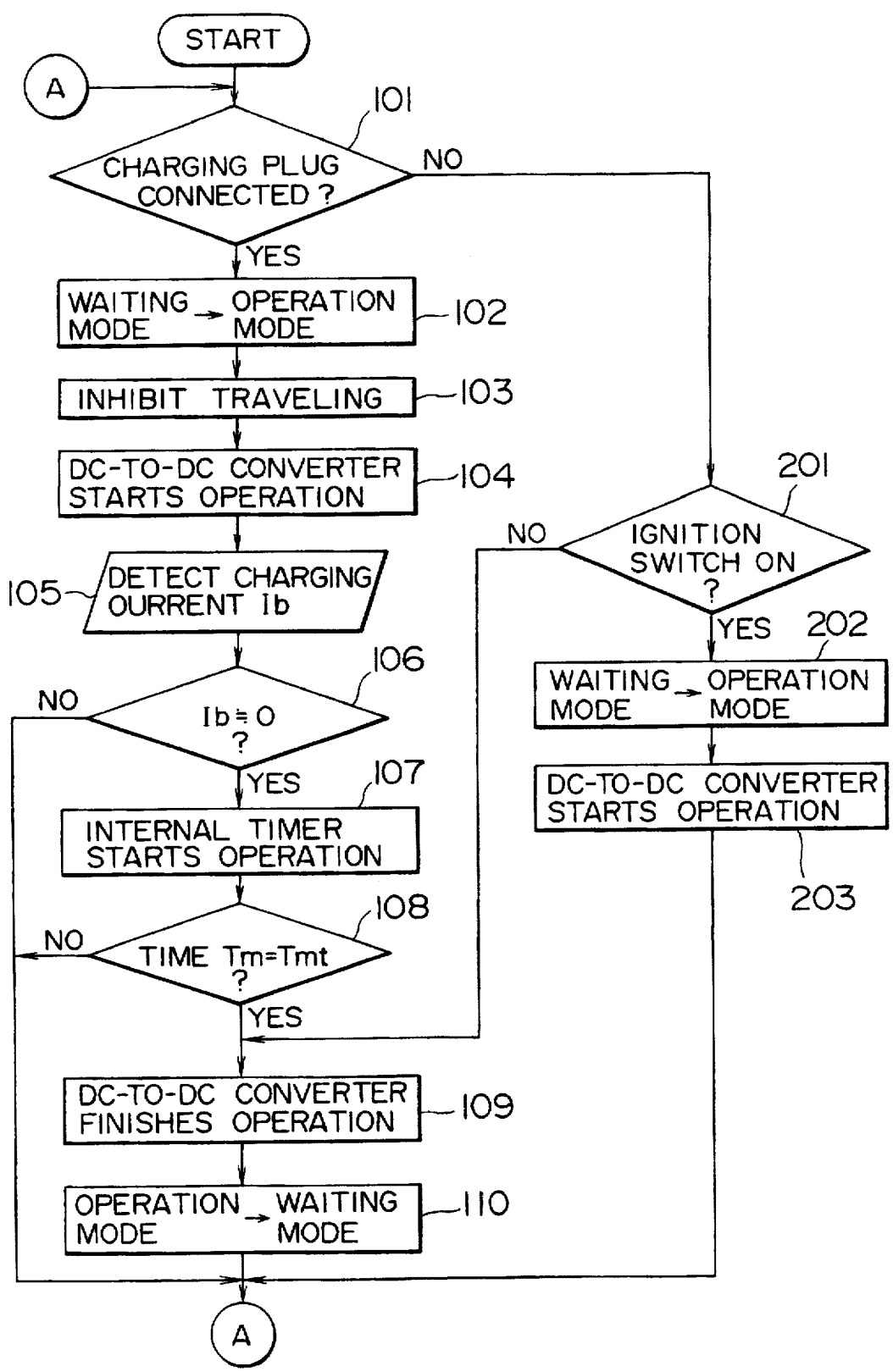
FIG. 2 is a flow chart showing an example of operation of a main controller in the embodiment of FIG. 1.

FIG. 2 is a flow chart showing an example of the operation of the main controller 26 of the charging control unit 10. The operation of the charging control unit 10 is now described with reference to FIGS. 1 and 2.

In the initial state, the main controller 26 is in the waiting state. The main controller first judges whether the charging plug 16 is connected or not (step 101). When the plug connection signal Sp is outputted, the main controller changes its state from the waiting mode to the operation mode (step 102) and produces a control signal Sd for inhibiting travel motion in order to supply this signal to the driving circuit 32D (step 103). Then, the control signal Sr for closing the charging contacts 12P and 12N and the contacts 24P and 24N for the converter is supplied to the relay control unit 34. When the charging contacts 12P and 12N are closed, the operation for charging a current from the charger 12 to the main battery 20 is started. When the contacts 24P and 24N for the converter are closed, the DC-to-DC converter 24 starts its operation so that the output voltage Vc of the charger 12 is converted into an output voltage Vd (for example, 12 V) and the output voltage Vd is applied to the auxiliary battery 30 and the like (step 104). During the charging operation, the charging current Ib is detected by the current sensor 22 (step 105) and it is judged whether the charging current Ib is about zero or not (step 106). When the charging current Ib reduces to about zero, an internal timer (not shown) starts its operation (step 107), and it is judged whether time Tm reaches a predetermined time Tmt or not (step 108). When time Tm reaches the predetermined time Tmt (for example 30 minutes), the control signal Sr for opening the charging contacts 12P and 12N and the contacts 24P and 24N for the converter is supplied to the relay control unit 34. When the charging contacts 12P and 12N are opened, the charging operation from the charger 12 to the main battery 20 is finished. When the contacts 24P and 24N for the converter are opened, the DC-to-DC converter 24 finishes its operation (step 109). The DC-to-DC converter 24 finishes its operation, so that waste of the power consumption and overcharging of the auxiliary battery 30 can be prevented. Then, the main controller changes its state from the operation mode to the waiting mode (step 110) and the process is returned to step 101. Further, when the charging current Ib is not close to zero in step 106 or when time Tm does not reach the predetermined time Tmt in step 108, the process is returned to step 101. The power consumption in the waiting mode is very small.

On the other hand, in step 101, when the charging plug 16 is not connected, it is judged whether the ignition switch 38 is on (closed) or not (step 201). If the traveling start signal Ss is outputted, the main controller changes its state from the waiting mode to the operation mode (step 202), so that the control signal Sr for closing the contacts 24P and 24N for the converter is supplied to the relay control unit 34 and the control signal Sd is supplied to the driving circuit 32D. When the contacts 24P and 24N for the converter are closed, the DC-to-DC converter 24 starts its operation so that the output voltage Vm of the main battery 20 is converted into the output voltage Vd (for example 12 V) and the output voltage Vd is applied to the auxiliary battery 30 and the like (step 203). Further, in step 201, when the ignition switch 38 is off (closed), the process proceeds to step 109.

It is needless to say that the present invention is not limited to the above embodiment. For example, the means for detecting the completion of charging may be a voltage sensor or a current sensor having high accuracy. Further, the means for detecting the completion of charging may be a terminal and a lead for transmitting the completion-of-charging signal from the charger to the main controller.

I claim:

1. A charging control unit of an electric automobile comprising first detection means for detecting connection of a charging plug of a charger to a receptacle, second detection means for detecting completion of charging from said charger to a main battery, and control means for starting operation of a DC-to-DC converter when connection of said charging plug is detected by said first detection means and for terminating the operation of said DC-to-DC converter when completion of charging is detected by said second detection means.

2. A charging control unit of an electric automobile according to claim 1, wherein said second detection means comprises a current sensor for detecting a charging current and said control means judges that completion of charging is detected when a predetermined time has passed after the charging current detected by said current sensor reduces to about zero.

3. A charging control unit of an electric automobile according to claim 1, wherein said control unit preserves data stored in a memory at least until the next charging operation after completion of charging.

4. An electric power system for an electric automobile comprising:

a motor for propelling the automobile;

a main battery for powering said motor;

a charging control unit which recharges said main battery in a controlled manner with power supplied by an external charger comprising first detection means for detecting connection of a charging plug of said external charger to a receptacle, second detection means for detecting completion of charging from said charger to said main battery, and control means for starting operation of a DC-to-DC converter when connection of said charging plug is detected by said first detection means and for terminating the operation of said DC-to-DC converter when completion of charging is detected by said second detection means; and a driving circuit which drives said motor with power supplied from said main battery.

5. The electric automobile according to claim 4, further comprising an auxiliary battery for supplying power to said charging control unit.

6. The electric automobile according to claim 4 wherein said second detection means comprises a current sensor for detecting a charging current and said control means judges that completion of charging is detected when a predetermined time has passed after the charging current detected by said current sensor reduces to about zero.

7. The electric automobile according to claim 4, wherein said control unit preserves data stored in a memory at least until the next charging operation after completion of charging.

8. The electric automobile according to claim 7, wherein said preserved data includes data on input current flow into said main battery and those on temperature of the battery during recharging said main battery.

9. A power system for powering an electric automobile, comprising:

a motor for propelling the automobile;

a main battery for electrically powering said motor;

a charging control system for recharging said main battery in a controlled manner with power supplied from an external charger, said charging control system comprising:

a first detector for detecting connection of the external charger to the charging control system;

a second detector electrically connected to said main battery for detecting a predetermined electrical condition, said predetermined electrical condition corresponding to completion of charging of said main battery from the external charger;

a DC-to-DC converter operably associated with said main battery; and a controller electrically connected with said first and second detectors and said DC-to-DC converter for starting operation of said DC-to-DC converter when connection of the external charger is detected by said first detector and for electrically disconnecting said DC-to-DC converter from said main battery when said main battery has been recharged; and a driving circuit operably associated with said motor and said main battery, wherein said driving circuit drives said motor with power supplied from said main battery.

10. A power system according to claim 9, further comprising an auxiliary battery for supplying power to said charging control system, and wherein said main battery is electrically disconnected from said driving circuit during the recharging of said main battery.

11. A power system according to claim 9, wherein said charging control system further comprises a relay control unit and a plurality of electrical contacts configured to engage and disengage said DC-to-DC converter from said main battery and from the external charger corresponding to initiation and completion of charging.

12. A power system according to claim 10, wherein said charging control system further comprises electronic memory which stores data concerning the charging operation at least until the next subsequent charging operation.

13. A power system according to claim 10, wherein said charging control system is positioned in the automobile.

14. A charging control unit for recharging the main battery of an automobile battery in a controlled manner, comprising:

a first detector for detecting connection of the external charger to the charging control system;

a second detector electrically connected to said main battery for detecting a predetermined electrical condition, said predetermined electrical condition corresponding to completion of charging of said main battery from the external charger;

a DC-to-DC converter operably associated with the main battery; and a controller electrically connected with said first and second detectors and said DC-to-DC converter for starting operation of said DC-to-DC converter when connection of said charging plug is detected by said first detector and for electrically disconnecting said DC-to-DC converter from said main battery upon completion of charging.

15. A control unit according to claim 14, further comprising an auxiliary battery for powering said charging control system.

16. A control unit according to claim 15, further comprising a relay control unit and a plurality of electrical contacts configured to engage and disengage said DC-to-DC converter from said main battery and the external charger corresponding to initiation and completion of said charging.

17. A control unit according to claim 16 wherein said controller includes electronic memory which stores data concerning the charging operation at least until the next subsequent charging operation.

18. A control unit according to claim 17, wherein said controller directs said relay control unit to disconnect said electrical contacts and terminate said charging operation a predetermined time after said second detector reaches a predetermined electrical value.

19. A control unit according to claim 16, wherein said control unit is positioned internal to the automobile.

* * * * *